United States Patent [19]

Oba

[11] Patent Number: 4,692,938

[45] Date of Patent: Sep. 8, 1987

[54] X-RAY SHADOW GRAPH DEVICE

[75] Inventor: Koichiro Oba, Hamamatsu, Japan

[73] Assignee: Hamamatsu Photonics Kabushiki Kaisha, Shizuoka, Japan

[21] Appl. No.: 805,426

[22] Filed: Dec. 4, 1985

[30] Foreign Application Priority Data

Dec. 11, 1984 [JP] Japan .................................. 59-261439

[51] Int. Cl.⁴ .............................................. G01N 23/04

[52] U.S. Cl. ....................................... 378/62; 378/136; 378/121

[58] Field of Search ....................... 378/62, 78, 87, 51, 378/136, 63, 78, 10, 72, 53, 121; 250/493.1

[56] References Cited

U.S. PATENT DOCUMENTS

| | | | |
|---|---|---|---|
| 3,991,309 | 11/1976 | Hauer | 378/72 |
| 4,317,994 | 3/1982 | Mallozzi et al. | 378/53 |

*Primary Examiner*—Carolyn E. Fields
*Assistant Examiner*—Joseph A. Hynds
*Attorney, Agent, or Firm*—Spencer & Frank

[57] ABSTRACT

An X-ray shadow graph device comprising a light source, an X-ray tube, light connection means, a sample, an image recording device, and sample excitation means, which obtains a transmission image or transmission diffraction image of X rays with a time resolution of 10 ps or less when the sample is stimulated by a light pulse or voltage pulse signal with an extremely short duration time of approximately 1 ps.

5 Claims, 3 Drawing Figures

X-RAY SHADOW GRAPH DEVICE

BACKGROUND OF THE INVENTION

The present invention relates to an X-ray shadow graph device for observing the dynamic change of a sample excited by light or voltage pulses by exposing the sample to a precisely controlled X-ray pulse with an extremely short duration of time.

FIG. 1 shows a cross-sectional view of the conventional X-ray shadow graph device.

An X-ray tube 20 used in the conventional X-ray shadow graph device consists of a heater 18, cathode 17 to emit electrons, control grid 16 and electron lens 15. A target 14 to generate X rays is accomodated in a vacuum envelope 19 having a window 13 consisting of beryllium (Be). A control pulse is applied to control grid 16 of X-ray tube 20, a pulse current is emitted from cathode 17, and an X-ray pulse 8 having a short duration time is generated by striking the target with the pulse current.

The transmission image or transmission diffraction image is recorded on image recording device 10 when sample 9 is exposed to the X-ray pulse 8 having an extremely short duration time.

In the conventional X-ray tube, a pulse voltage is applied to the control grid thereof in order to generate the electron pulse required for generating the X-ray pulse. Due to the capacitance of the electrodes, the minimal pulse width available in the conventional X-ray tube is limited to 1 ns or longer.

The objective of the present invention is to present an X-ray shadow graph device wherein a new type of X-ray pulse tube is used to generate X rays responding to an electron beam emitted from the X-ray pulse source forming a photocathode which is formed in the X-ray tube and is excited with extremely short light pulses generated by a laser device.

SUMMARY OF THE INVENTION

The X-ray shadow graph device in accordance with the present invention consists of a light source to generate a light pulse with an extremely short duration time, an X-ray tube composed of a photocathode and an X-ray target which can generate an X-ray pulse when exposed to electrons emitted from the photocathode, light connection means to connect the light pulse to the photocathode of the X-ray tube, a sample arranged in such a location that the X-ray pulse is incident thereon, an image recording device to record the X-ray transmission image of the sample, and sample excitation means to excite the sample synchronized with the light pulse.

DESCRIPTION OF THE PREFERRED EMBODIMENTS

The present invention will be described hereafter in detail, referring to the attached drawings.

Figure 1:
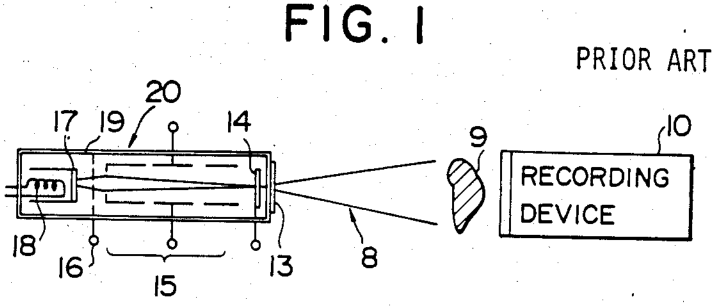
FIG. 1 PRIOR ART
FIG. 1 shows a cross-sectional view of the conventional X-ray shadow graph device.
Figure 2:
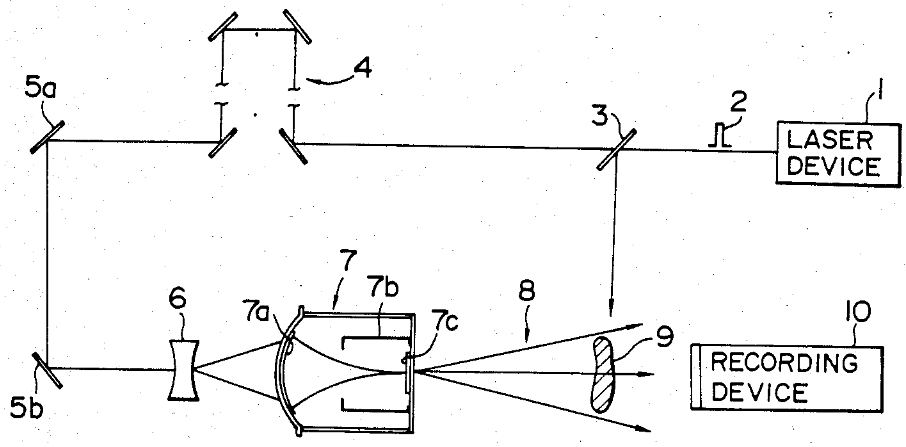
FIG. 2 is a block diagram of a first embodiment of the X-ray shadow graph device in accordance with the present invention.

A sample 9 in FIG. 2 is excited by a light pulse or an electric pulse so that the shadow graph of the sample can be obtained in a fixed short time after the sample excitation by means of the delay time in optical delay unit 4.

Part of laser pulse 2 with a duration of 1 ps or so, which is generated from laser device 1, is reflected from half mirror 3 and goes into sample 9 made of a semiconductor material to be excited thereby. A crystal phase transition can occur in sample 9 due to laser annealing.

The light pulse after passing through half mirror 3 is delayed while passing through light delay path 4 to provide a specified delay time.

The delayed light pulse is reflected from reflector mirrors 5*a* and 5*b*, and enters into expander lens 6 to expand the beam diameter thereof. The light pulse from expander lens 6 is incident on X-ray pulse generation tube 7 which consists of photocathode 7*a*, focusing electrode 7*b* to focus the electrons emitted from photocathode 7*a* and X-ray target 7*c*. As for X-ray pulse generation tube 7, it is disclosed in Japanese Patent Application No. 153663/1983 filed by the assignee of the present invention.

Sample 9 is exposed to the X rays generated from target 7*c* which is excited by the electron beam emitted from photocathode 7*a* when said light pulse is incident thereon. The shadow graph of sample 9 is recorded by using image recording device 10, i.e., an X-ray image intensifier, an X-ray camera or an X-ray film.

A sample crystal structure changed due to laser pulse beams is sampled by using X-ray pulses, each having an extremely short duration time and also being synchronized with the exciting light pulses, so as to obtain a transmission image or a transmission diffraction image of X-rays.

Figure 3:
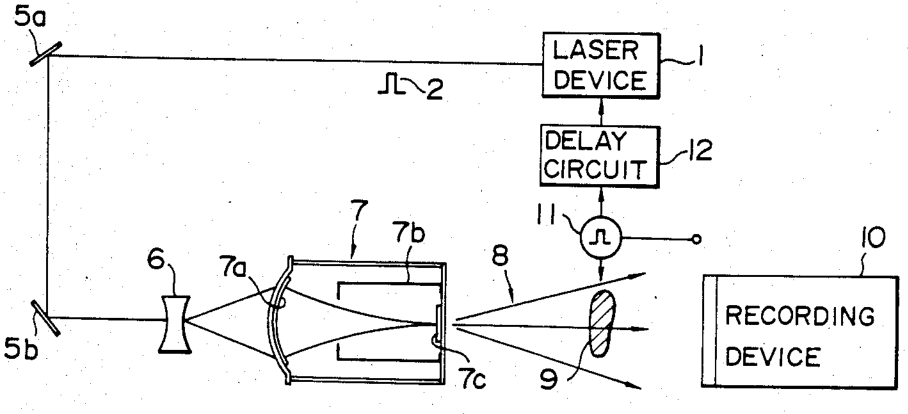
FIG. 3 is a block diagram of a second embodiment of the X-ray shadow graph device in accordance with the present invention.

A sample 9 in FIG. 3 is excited by a voltage pulse so that the shadow graph of the sample can be obtained in a fixed short time after the sample is excited.

The transmission image or transmission diffraction image caused by changes in the sample crystal structure in response to stimulus applied to the sample by a voltage pulse signal can be recorded by sampling the response of the sample to a train of X-ray pulses having an extremely short duration time.

The voltage pulse signal generated responding to trigger 11 is applied to sample 9 made of a piezoelectric material.

In another case, the voltage pulse is applied to the piezoelectric material to produce mechanical shock or vibration which, in turn, is applied to the sample attached to the piezoelectric material to create mechanical deformation of the sample. The mechanical deformation is detected by the X-ray shadow graph in the same way as described above.

The voltage pulse signal generated responding to trigger 11 is delayed by delay circuit 12, and applied to laser device 1 so as to generate light pulse 2.

The light pulse 2 is reflected from reflector mirrors 5*a* and 5*b*, and goes into expander lens 6 to expand the beam diameter thereof. Light pulse 2 with expanded beam diameter is incident on X-ray pulse generation tube 7.

Sample 9 excited by the voltage pulse signal is exposed to the X rays generated by the X-ray pulse generation tube 7, and then the X-ray shadow graph of the sample 9 can be recorded on image recording device 10.

Modifications and variations of the present invention are included within the scope thereof.

In the embodiments of the present invention, a semiconductor material is used as a sample to be excited by light pulse and a piezoelectric material is used as a sample to be excited by voltage pulse signal.

As well as a semiconductor material, macromolecule materials, metals and crystals can be used as samples to be tested.

The shadow graph of any sample excited by mechanical, thermal or other type of stimulus can also be obtained. Although the record of the shadow graph obtained by a single X-ray pulse is described in the embodiments, those obtained by multiple X-ray pulses can be described.

When a light pulse with a short duration time of 1 ps or so is incident on the X-ray pulse generation tube in accordance with the present invention, the sample structure changed at an arbitrary point of time can be recorded with a time resolution of as short as 10 ps or less.

What is claimed is:

1. An X-ray shadow graph device for observing dynamic changes in a sample comprising a light source for generating a light pulse having a time duration of approximately 1 ps.;

an X-ray tube including a photocathode and an X-ray target, said X-ray target generating an X-ray pulse in response to electrons emitted by said photocathode impinging thereon;

means coupling said light source to the photocathode of said X-ray tube, said photocathode emitting said electrons when said light pulse impinges thereon;

an image recording device positioned for receiving and recording an X-ray transmission image of said sample; and means for exciting said sample in synchronism with said light pulse.

2. An X-ray shadow graph device as claimed in claim 1, wherein said means for exciting said sample includes a light splitter interposed between said light source and said X-ray tube, a portion of the light emitted by said light source impinging on said sample for the excitation thereof.

3. An X-ray shadow graph device as claimed in claim 2, wherein said means coupling said light source to the photocathode of said X-ray tube includes a light delay path, said light delay path delaying impingement of said light pulse on said photocathode so that said X-ray transmission image is received by said image recording device a fixed time after said sample is excited by said light pulse.

4. An X-ray shadow graph device as claimed in claim 1, wherein said means for exciting said sample includes voltage excitation means for generating a voltage pulse signal, said voltage pulse signal being applied to said sample in synchronism with generation of said light pulse by said light source.

5. An X-ray shadow graph device as claimed in claim 4 wherein means are provided for generating said light pulse a fixed time after said voltage pulse signal is applied to said sample, such that said sample is excited by said voltage pulse signal before said X-ray pulse is generated.

* * * * *